Feb. 26, 1957 R. C. BODEM 2,782,766
ACTUATOR LOCKING MEANS
Filed Jan. 5, 1954

INVENTOR.
Roy C. Boden
BY Craig V. Morton
Attorney

United States Patent Office 2,782,766
Patented Feb. 26, 1957

2,782,766

ACTUATOR LOCKING MEANS

Roy C. Bodem, Dayton, Ohio, assignor to General Motors Corporation, Detroit, Mich., a corporation of Delaware Application January 5, 1954, Serial No. 402,289

8 Claims. (Cl. 121—40)

This invention pertains to actuators, and particularly to releasable locking means for fluid pressure operated actuators.

Heretofore, fluid pressure operated actuators of the type including a cylinder having disposed therein a reciprocable piston capable of fluid pressure actuation in either direction, the piston being operatively connected with a rotatable member such that reciprocation of said piston is dependent upon and effects rotation of said member, have included various types of locking means for restraining rotation of the rotatable member when the actuator is inactive. This type of locking actuator is used primarily in aircraft installation, where movement of a load device, in the form of an aircraft control surface, must be accurately controlled and retained in the adjusted position to prevent a mishap. This invention pertains to an improved locking device for an actuator of the aforementioned type. Accordingly, among my objects are the provision of locking means for an actuator; and the further provision of releasable locking means for a fluid pressure operated actuator.

The aforementioned and other objects are accomplished in the present invention by providing ball and groove type locking means. Specifically, the actuator includes a cylinder having disposed therein a reciprocable piston capable of fluid pressure actuation in either direction. The piston includes a rod portion, which projects through one end of the cylinder and is adapted for connection to either a relatively movable load device, or a fixed support. The other end of the cylinder is provided with a fixture, which, likewise, may be attached to either the fixed support, or the relatively movable load device. In any event, only relative linear movement between the piston and cylinder is required to adjust the load device, and both the cylinder and piston are restrained against rotation. The piston carries a non-rotatable hollow member, which constitutes the nut of the well known ball-screw and nut coupling. A rotatable member, in the form of a screw shaft, is journaled in the cylinder and extends through the non-rotatable hollow member, the operative connection between the members being constituted by a plurality of circulating balls.

The head end of the actuator cylinder is enlarged, and the screw shaft is operatively connected to a cup-shaped member disposed in the enlarged cylinder end. The cup-shaped member consitutes one locking element as well as a lock release cylinder within which a reciprocable piston capable of fluid pressure actuation in one direction, is disposed. The lock release piston is capable of spring actuation in the other direction. The bottom wall of the cup-shaped cylinder is formed with a ring of circumferentially spaced, circular openings, each opening carrying a ball. The balls constitute part of the locking means. The enlarged cylinder end is also provided with a stationary plate, constituting the other locking element, and having a plurality of circumferentially spaced, radially extending ball receiving grooves of semi-circular cross section.

When the actuator is inactive, the engaging spring of the locking means urges the lock release piston in a direction thrusting the balls into the grooves of the fixed plate whereupon rotation of the screw shaft is precluded, thereby preventing reciprocation of the actuator piston. Upon the application of fluid pressure to the cylinder so as to effect piston movement in either direction, pressure fluid is concurrently applied to the lock release cylinder so as to effect movement of the lock release piston. In this manner, locking balls are free to move longitudinally throughout a distance equal to the stroke of the lock release piston, and, accordingly, when pressure fluid is applied to either surface of the piston, the torque applied to the screw shaft will move the balls longitudinally out of the ball receiving grooves in the fixed plate, thereby permitting reciprocation of the piston.

Further objects and advantages of the present invention will be apparent from the following description, reference being had to the accompanying drawing wherein a preferred embodiment of the present invention is clearly shown.

Figure 1:
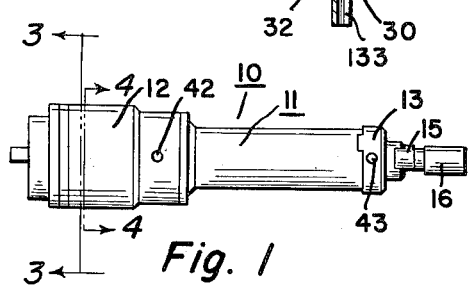
Fig. 1 is a view, in elevation, of an actuator including the locking means of this invention.

With reference to Fig. 1, the locking means of this invention are shown in combination with an actuator 10 comprising a cylinder 11. The cylinder 11 includes a head cap assembly 12 and a tail cap assembly 13.

Figure 2:
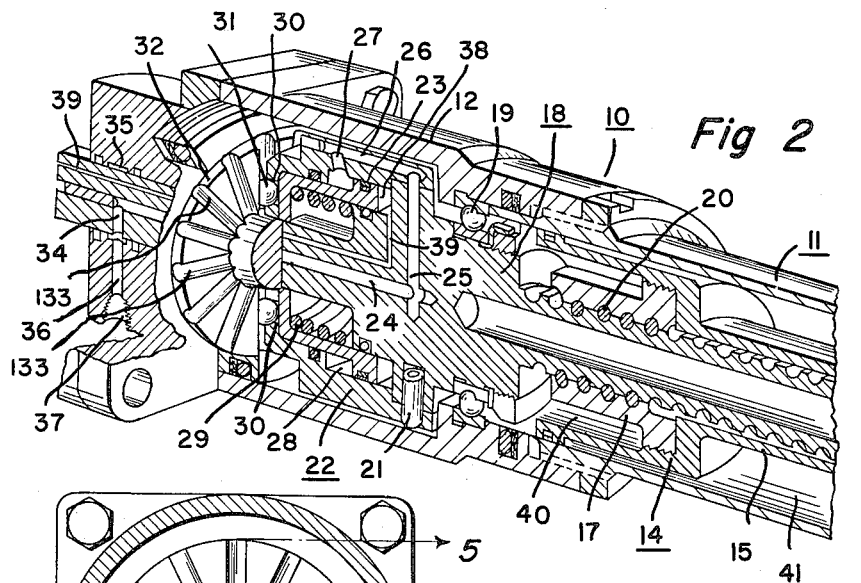
Fig. 2 is a fragmentary view, partly in section and partly in elevation, of the actuator depicted in Fig. 1.

With reference to Fig. 2, it may be seen that the actuator cylinder 11 has disposed therein a reciprocable piston 14 capable of fluid pressure actuation in either direction. The piston 14 is formed with an integral hollow rod portion 15, which extends longitudinally through the tail cap assembly 14, the free end of the rod 15 being attached to a fixture 16, by which the rod may be attached to either a relatively movable load device or a fixed support, not shown. The head cap assembly 12 of the cylinder may, likewise, either be connected to the fixed support or the relatively movable load device, not shown.

The head of piston 14 carries a hollow member 17 having an internal spiral groove of semi-circular cross section. Inasmuch as the piston 14 is restrained against rotation by reason of its connection to either a load device or a fixed support, the hollow nut member 17 is, likewise, restrained against rotation, but moves lineally with the piston 14. The nut 17 constitutes a component of the well known ball, screw and nut coupling, the screw of which is constituted by a member 18 rotatably journaled in the head cap assembly 12 by a bearing means 19. The screw shaft member 18 is formed with a complementary spiral groove of semi-circular cross section, and operatively engages the nut 17 through the agency of a plurality of circulating balls 20. The balls 20 are free to circulate during relative rotation between the nut and screw by suitable passage means carried by the nut, not shown. From the foregoing, it is apparent that reciprocation of the piston 14 is dependent upon relative rotation between the nut 17 and the screw shaft 18.

The head end of the screw shaft 18 is connected by a dowel pin 21 to a cup-shaped member 22, which is disposed in the enlarged portion of the head cap assembly 12. The cup-shaped member 22 constitutes one of the locking elements and a lock release cylinder, and is connected to rotate with the screw shaft 18. A reciprocable piston 23 is disposed within the lock release cylinder 22, the piston 23 being capable of fluid pressure actuation to the right, as viewed in Fig. 2, and spring actuation to the left. Accordingly, the screw shaft 18 is formed with a central bore 24 having communication with a radial bore 25, which communicates with a longitudinal passage 26 in the cylinder 22. The longitudinal passage 26, in turn, communicates with a passage 27 through which pressure fluid may be admitted to the lock release chamber 28 formed by the cup-shaped cylinder member 22.

The piston 23 is also of cup-shaped configuration, and a coil compression spring 29 is situated within the cup-shaped portion thereof. One end of the spring 29 engages the piston 23, and the other end of the spring engages the screw shaft 18. Accordingly, in the absence of fluid pressure application to the lock release chamber 28, the piston 23 will be urged to the left into engagement with the bottom wall of cup-shaped member 22, as shown in Fig. 2.

Figure 4:
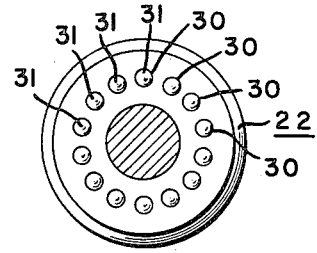
Fig. 4 is an enlarged sectional view taken along line 4—4 of Fig. 1.

With reference to Figs. 2 and 4, it may be seen that the bottom wall of the cup-shaped cylinder member 22 is formed with a ring of circumferentially spaced circular openings 30. Each of the openings 30 is adapted to receive a locking ball 31. The balls 31 are snugly received in the openings 30, but sufficient clearance is provided to enable relative longitudinal movement therebetween. The balls 31 constitute one component of the locking means to be described.

Figure 3:
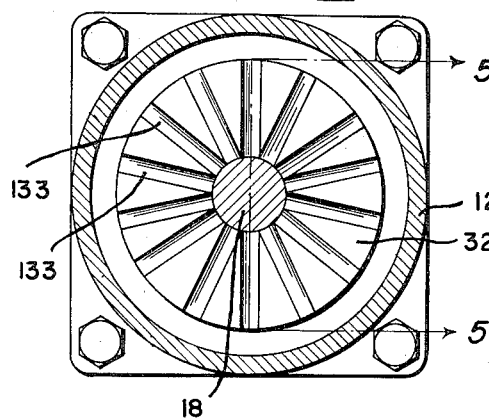
Fig. 3 is an enlarged sectional view taken along line 3—3 of Fig. 1.
Figure 5:
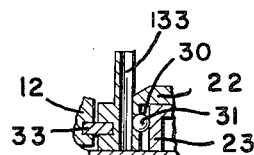
Fig. 5 is a fragmentary sectional view of the locking means in the released position, the view being taken along line 5—5 of Fig. 3.

With reference to Figs. 2, 3 and 5, the head cap assembly 12 also contains a stationary plate element 32, the plate 32 being rigidly attached to the head cap assembly 12 by any suitable means, such as dowel pins 33, depicted in Fig. 5. Accordingly, the plate element 32 is restrained against rotation, and is also restrained against longitudinal movement relative to the tail cap assembly 12. The fixed plate 32 is formed with a plurality of circumferentially spaced, radially extending grooves 133, of semi-circular cross section. The grooves 133 are adapted to receive the projected ends of balls 31, when the piston 23 is in the position of Fig. 2. Consequently, engagement of the balls 31 with the grooves 133 of the plate 32 will prevent rotation of the lock release cylinder 22 and the screw shaft 18, and thereby lock the piston 14 against movement. Thus, the balls 31 constitute the operative connection between the two locking elements when the actuator is locked.

Upon the application of pressure fluid to the lock release chamber 28, the lock release piston 23 will move to the right, as viewed in Fig. 2, to the position shown in Fig. 5. In so moving, the balls 31 are permitted to move longitudinally relative to the lock release cylinder 22, and upon the application of pressure fluid to the cylinder 11 on either side of the piston 14, the screw shaft will be subjected to a force tending to rotate the same, which torque will be transmitted to the element 22. By reason of the semi-circular cross section of the locking grooves in the plate 32, the balls 31 will be cammed, or wedged, to the right, as viewed in Fig. 2, to the position of Fig. 5, whereupon the locking means are released.

It should be noted that the linear travel of lock release piston 23 under the urge of fluid presure in chamber 28, is limited so that the locking balls 31 cannot be moved out of the circular openings 30 in the lock release cylinder 22. Thus, it is only necessary to move the balls 31 a sufficient distance to the right, as viewed in Fig. 2, so that the peripheral surfaces thereof do not engage the stationary plate 32.

With reference to Figs. 1 and 2, it may be seen that the piston 14 divides the cylinder 11 into an extend chamber 40 and a retract chamber 41. The extend chamber 40 is connected by suitable passage means, not shown, to an extend port 42 in the head cap assembly 12. Similarly, the retract port 41 is connected by suitable passage means, not shown, to a retract port 43 in the tail cap assembly 13. The arrangement of ports and passages may be similar to that shown in Patent No. 2,643,642, issued June 30, 1953, in the name of Howard M. Geyer. Moreover, suitable valve means may be provided for concurrently applying pressure fluid to the lock release cylinder whenever pressure fluid is applied to either the retract or extend chambers, while the chamber to which pressure fluid is not applied is connected to drain. These valve means may be of the type shown in copending application, Serial No. 394,660, filed November 27, 1953, in the name of Howard M. Geyer.

The passage 24 in the screw shaft 18 connects with a radial passage 34, which is always in communication with an annular groove 35 formed in the head cap assembly 12. The head cap assembly 12 is further formed with a passage 36 having communication with a brake release port 37. In addition, chamber 38 of the lock release cylinder 22 may be vented to atmosphere to passage means 39 formed within the screw shaft 18. As shown in Fig. 2, the screw shaft 18 may project through the end wall of head cap assembly 12, by which means a plurality of actuators may be interconnected for synchronized operation.

The operation of the locking means is believed to be apparent from the foregoing description. However, a resume of the operation is as follows: When pressure fluid is concurrently admitted to the retract chamber 41 and the lock release cylinder chamber 28, while retract chamber 40 is connected to drain, the longitudinal thrust exerted on the piston 14 by pressure fluid in the retract chamber 41 will exert torque on the screw shaft 18. By reason of the lock release piston 23 having been moved to the position of Fig. 5, the torque transmitted to screw shaft 18 will cam the balls 31 out of engagement with the stationary locking plate 32 so as to permit rotation of the screw shaft 18 and linear movement of the piston 14. When the application of pressure fluid to the retract chamber 41 is discontinued, and concurrently therewith the lock release chamber 28 is connected to drain, the spring 29 will move the piston 23 to the position of Fig. 2, whereupon the balls 31 will be thrust through the openings 30 and into engagement with the locking grooves of the stationary locking plate 32. In this manner, rotation of the screw shaft 18 is precluded, and, consequently, linear movement of the piston 14 is prevented.

While the embodiment of the present invention as herein disclosed, constitutes a preferred form, it is to be understood that other forms might be adopted.

What is claimed is as follows:

1. The combination with a fluid pressure operated actuator having a cylinder and a reciprocable piston disposed in said cylinder capable of fluid pressure actuation in either direction; locking means disposed in said cylinder and operatively associated with said piston for preventing movement thereof in the absence of fluid pressure application to said cylinder, said locking means being operable to prevent piston movement at any position of said piston with respect to said cylinder and comprising a stationary locking element, a locking element movable relative to said stationary element to permit movement of said piston, one of said locking elements having a plurality of grooves therein, the other of said locking elements having a plurality of openings therein, and a plurality of balls disposed within the openings of said other locking element and engageable with the grooves in said one locking element for interconnecting said elements so as to prevent movement of said movable locking element, and means operable to release said locking means to permit movement of said piston.

2. The combination with a fluid pressure operated actuator having a cylinder, a reciprocable piston disposed in the cylinder capable of fluid pressure actuation in either direction, and a member rotatably journaled in the cylinder and operatively connected with the piston such that movement of the piston is dependent upon and effects rotation of said member; of locking means disposed in said cylinder and operatively connected with said rotatable member for restraining rotation thereof and consequently preventing movement of said piston in the absence of fluid pressure application to said cylinder, said locking means comprising a stationary locking element having a plurality of grooves, a locking element movable relative to said stationary element to permit movement of said piston, and a plurality of balls carried by said movable locking element and engageable with the grooves in said stationary locking element for interconnecting said elements so as to restrain movement of said movable locking element, and means operable to facilitate movement of said balls out of said grooves to release said locking means and permit movement of said piston.

3. The combination set forth in claim 2 wherein the means for releasing said locking means includes a piston engageable with said plurality of balls, said piston being capable of linear movement in one direction by the application of pressure fluid so as to facilitate the interruption of the operative connection between said balls and said elements.

4. The combination with a fluid pressure operated actuator having a cylinder, a reciprocable piston disposed in the cylinder capable of fluid pressure actuation in either direction, and a member rotatably journaled in the cylinder and operatively connected with the piston such that movement of the piston effects rotation of the member, the operative connection between said rotatable member and said piston including a non-rotatable member having threaded engagement with said rotatable member and constrained for movement with said piston; of releasable locking means disposed in said cylinder and operatively connected with said rotatable member for restraining rotation thereof and consequently preventing movement of said piston in the absence of fluid pressure application to said cylinder, said locking means comprising a stationary locking element having a plurality of grooves, a locking element movable releative to said stationary element to permit movement of said piston, and a plurality of balls carried by said movable locking element and engageable with the grooves in said stationary locking element for interconnecting said elements so as to restrain movement of said movable locking element, and means operable to facilitate movement of said balls out of said grooves to release said locking means and permit piston movement.

5. The combination set forth in claim 4 wherein the means for releasing said locking means includes a piston engageable with said plurality of balls, said piston being capable of linear movement in one direction by the application of pressure fluid so as to facilitate the interruption of the operative connection between said balls and said elements.

6. The combination with a fluid pressure operated actuator having a cylinder, a cylinder, a reciprocable piston disposed in said cylinder capable of fluid pressure actuation in either direction, and a member rotatably supported in said cylinder and operatively connected with said piston such that movement of said piston a dependent upon and effects rotation of said member; of locking means operatively associated with said rotatable member for restraining rotation thereof and consequently preventing movement of said piston, said locking means comprising a stationary locking element having a plurality of grooves of semi-circular cross section, a relatively rotatable locking element having a plurality of openings equal in number to the number of grooves in said first locking element, a plurality of balls confined in the holes of said rotatable locking element, and resilient means for urging said balls into operative engagement with the grooves of said stationary locking element so as to prevent relative rotation therebetween, said rotatable locking element being operatively connected to said rotatable actuator member, and means for releasing said locking means upon the application of pressure fluid to said cylinder comprising a lock release piston capable of fluid pressure actuation in one direction, said lock release piston being arranged to oppose said resilient means, whereby the application of torque to said rotatable locking element by said rotatable actuator member will effect movement of said balls so as to interrupt the operative connection between said locking elements.

7. An actuator assembly including in combination, a cylinder, a reciprocable piston disposed in the cylinder, a first member rotatably journaled in the cylinder and normally restrained against rotation, said first member being operatively connected to said piston, the operative connection between said piston and said first member including a second non-rotatable member constrained for movement with said piston, said first and second members having operative engagement whereby relative rotation will occur between said members in response to movement of said piston, locking means operatively associated with said member for restraining rotation thereof and consequently preventing reciprocable movement of the piston when the actuator is inactive, said locking means comprising a stationary locking element having a plurality of grooves, a rotatable locking element operatively connected to said rotatable member, and a plurality of balls carried by said movable locking element and engageable with the grooves in said stationary locking element for interconnecting said locking elements to restrain rotation of said member and consequently prevent movement of said piston, and means operable to facilitate movement of said balls out of said grooves to release said locking means and permit piston movement.

8. An actuator assembly including in combination, a cylinder, a reciprocable piston disposed in said cylinder, a first member rotatably journaled in said cylinder, said first member being operatively connected to said piston, the operative connection between said piston and said first member including a second nonrotatable member constrained for movement with said piston, said first and second members having operative engagement whereby relative rotation will occur between said members in response to piston movement, and releasable locking means operatively connected with said rotatable member for restraining rotation thereof and consequently preventing reciprocable movement of said piston when the actuator is inactive, said locking means comprising a stationary locking element having a plurality of circumferentially spaced radial grooves of semi-circular cross-section, a rotatable locking element operatively connected to said rotatable member and having a ring of circumferentially spaced circular openings, and a plurality of balls confined in said row of circular openings and adapted for longitudinal movement relative thereto into and out of engagement with the grooves of said stationary locking element for restraining or permitting rotation of said rotatable member and movement of said piston.

References Cited in the file of this patent

UNITED STATES PATENTS

| | | |
|---|---|---|
| 2,205,346 | Clench | June 18, 1940 |
| 2,393,962 | Ashton | Feb. 5, 1946 |
| 2,523,053 | Obrist | Sept. 19, 1950 |
| 2,643,642 | Geyer | June 30, 1953 |